W. & A. A. AYLING.
IGNITION LOCK FOR AUTOMOBILES.
APPLICATION FILED NOV. 13, 1917.
1,287,604.
Patented Dec. 17, 1918.
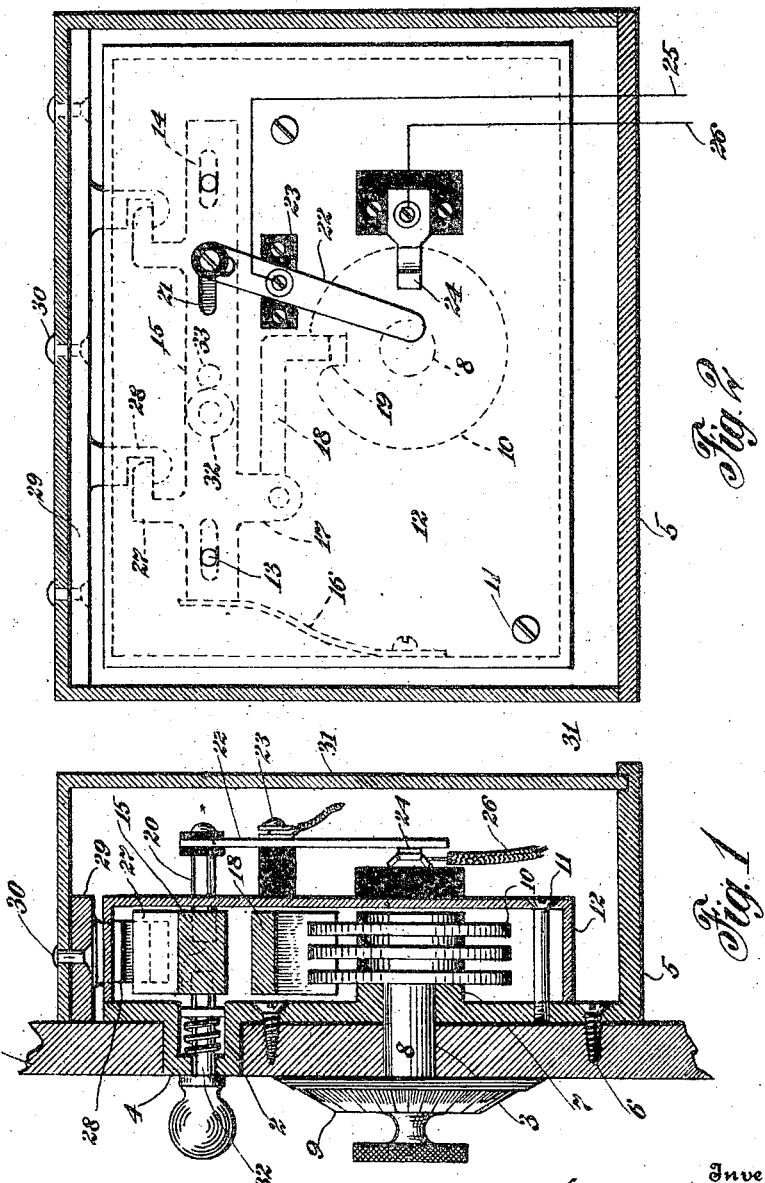
Witness
Charles Belg
Karl H. Butler
Inventors
William Ayling
Alfred A. Ayling.
By
Attorneys

UNITED STATES PATENT OFFICE.

WILLIAM AYLING AND ALFRED A. AYLING, OF DETROIT, MICHIGAN.

IGNITION-LOCK FOR AUTOMOBILES.

1,287,604.

Specification of Letters Patent.   Patented Dec. 17, 1918.

Application filed November 13, 1917.   Serial No. 201,754.

*To all whom it may concern:*

Be it known that we, WILLIAM AYLING and ALFRED A. AYLING, citizens of the United States of America, residing at Detroit, in the county of Wayne and State of Michigan, have invented certain new and useful Improvements in Ignition-Locks for Automobiles, of which the following is a specification, reference being had therein to the accompanying drawings.

This invention relates to an ignition lock for automobiles, and has special reference to a locking mechanism, including an electric switch actuated thereby, that will prevent persons from surreptitiously using an automobile, thieves from stealing the machine, or any person operating the automobile by its own power plant and the usual ignition system of the same.

The primary object of our invention is to provide an ignition lock including an electric switch, a slide bar for operating the switch, and a permutation lock for controlling the operation of the slide bar, said slide bar being also employed for locking a casing about the mechanism, so that the mechanism cannot be tampered with or an electric circuit completed within the casing independently of the switch.

A further object of our invention is to provide an ignition lock consisting of comparatively few parts that are compactly assembled and adapted to be installed on the inner side of an automobile dash or suitable support, so that the lock will be convenient to the operator of an automobile and at the same time occupy a position that will not interfere with parts of the ignition system or power plant of the automobile.

Our invention will be hereinafter specifically described and then claimed, and reference will now be had to the drawing wherein—

Figure 1 is a vertical sectional view of the ignition lock, and

Fig. 2 is a longitudinal sectional view of the casing showing a rear elevation of the locking mechanism.

In the drawing, the reference numeral 1 denotes a portion of an automobile dash or a suitable support and in order that our ignition lock may be installed thereon it is necessary that the dash be provided with two openings 2 and 3. The opening 2 accommodates an apertured hollow boss 4 carried by an angle bracket 5 secured to the inner face of the dash 1 by a screw 6 or other fastening means. The angle bracket 5 has a bearing 7 for the spindle or shaft 8 of a conventional form of permutation lock 9, said shaft or spindle extending through the opening 3 of the dash 1 so that the permutation lock 9 may be mounted against the outer face of the dash and conveniently operated by the chauffeur of an automobile.

The inner end of the shaft or spindle 8 has the usual tumbler disks 10 and connected to the angle bracket 5, by screws 11 or other fastening means is a housing 12 that is held against said angle bracket. Coöperating with the screws 11 in holding the housing 12 are studs 13 and these studs extend through slots 14 in a slide bar 15, said bar being supported by the studs 13 and normally engaged by a compression spring 16 carried by one end of the housing 12. The slide bar 15 has a depending lug 17 and connected thereto is a gravity dog 18 adapted to engage in notches 19 of the tumbler disks 10, providing all of said notches aline to receive the gravity dog.

Suitably connected to the slide bar 15 is a post 20 extending through a slot 21 provided therefor in the housing 12. Loosely connected to the post 20 and suitably insulated therefrom is the upper end of a switch arm 22 pivoted on an insulated support 23 carried by the housing 12. The lower end of the switch arm 22 is adapted to engage the switch or contact members 24 insulated from blades or contact members 24 insulated from and supported by the housing 12.

Lead in wires 25 and 26 are connected to the switch arm 22 and the contacts 24 respectively, said lead in wires forming part of the ignition system of an automobile so that the switch may make and break the ignition circuit and thereby control the operation of the power plant of the automobile.

The upper edge of the slide bar 15 is provided with latch members 27 adapted to engage in keepers 28 carried by a bar 29 suitably connected, as at 30, to a casing 31 having an open bottom adapted to be seated on the angle bracket 5 and inclose the housing 12 and the switch. The housing 12 is slotted to receive the keepers 28 and with the latch members 27 engaging with the keepers 28 it is practically impossible to remove the casing 31, consequently the switch cannot be tampered with.

In the apertured boss 4 of the angle bracket 5 is a spring pressed plunger 32 and this plunger is adapted to engage in a recess or socket 33 provided therefor in the slide bar 15.

To operate the ignition lock, it is necessary that the permutation lock be manipulated in the usual and well known manner according to certain combinations, whereby the tumbler disks 10 are successively brought into position to place all of the notches or slots 19 in alinement in order that gravity dog 18 may enter the notches or slots of the tumbler disks. It is then possible to rotate the tumbler disks counterclockwise, in reference to Fig. 2 of the drawing, so that the tumbler disks shift the slide bar 15 through the medium of the gravity dog 18. As the slide bar 15 is shifted against the action of the spring 16, the switch arm 22 is swung to a closed position completing the ignition circuit, and the spring pressed plunger 32 engages in the recess 33 and holds the slide bar 15 in its adjusted position.

In shifting the slide bar 15, the casing 31 has been unlocked, but said casing will still remain in engagement with the angle bracket 5, unless it is desired to examine the switch and lock mechanism.

By adjusting the permutation lock, and pulling outwardly upon the spring pressed plunger 32, the slide bar 15 may be released and actuated by the spring 16 to break the ignition circuit and lock the casing 31 on the angle bracket 5, such operation taking place when the chauffeur or owner of an automobile desires to place the same in condition that it cannot be moved by its own power plant.

It is thought that the operation and utility of the ignition lock will be apparent without further description, and while in the drawing there is illustrated a preferred embodiment of our invention, it is to be understood that the structural elements are susceptible to such variations and modifications as fall within the scope of the appended claims.

What we claim is:—

1. In an ignition lock for an automobile, the combination of an angle bracket adapted for attachment to the dash of an automobile, a housing carried by said bracket and having one side thereof open and adapted to be closed by said bracket, a permutation lock extending into said housing, a slide bar in said housing shiftable in one direction by said permutation lock, a spring in said housing engaging said slide bar, a switch on said housing operatable by reciprocable movement of said lock, and a casing having its bottom open and adapted to be closed by said bracket to inclose said housing and switch, said casing being locked on said bracket by said slide bar.

2. In an ignition lock for an automobile, the combination of an angle bracket, a housing carried thereby, a permutation lock having tumbler disks in said housing, a spring pressed slide bar in said housing above said lock, a dog carried by the lower edge of said slide bar adapted to engage the tumbler disks of said permutation lock and be shifted thereby to slide said bar, a switch arm pivotally connected to the outer side of said housing, means connecting one end of said arm to said bar so that the opposite end of said switch arm may be shifted by a reciprocable movement of said bar, a detachable casing on said bracket inclosing said housing and switch arm, depending keepers carried by the top of said casing and extending into said housing, and latch members carried by the top of said slide bar adapted to engage said keepers and lock said casing on said bracket.

In testimony whereof we affix our signatures in presence of two witnesses.

WILLIAM AYLING.
ALFRED A. AYLING.

Witnesses:
KARL H. BUTLER,
ANNA M. DORR.